United States Patent
Setty et al.

(10) Patent No.: US 9,273,751 B2
(45) Date of Patent: Mar. 1, 2016

(54) DOUBLE PUMPER MAGNETO-RHEOLOGICAL HYDRAULIC TIE BAR ASSEMBLY

(75) Inventors: Stephen Lewis Setty, Urbana, OH (US); David John Barta, Beavercreek, OH (US); Brent Wade Fourman, New Paris, OH (US); Eric Louis Schumann, Tipp City, OH (US); Steven E. Pyle, New Lebanon, OH (US)

(73) Assignee: BeijingWest Industries, Co. Ltd., Beijing (CN)

( * ) Notice: Subject to any disclaimer, the term of this patent is extended or adjusted under 35 U.S.C. 154(b) by 83 days.

(21) Appl. No.: 14/232,469

(22) PCT Filed: Jun. 4, 2012

(86) PCT No.: PCT/CN2012/076439
§ 371 (c)(1),
(2), (4) Date: Apr. 10, 2014

(87) PCT Pub. No.: WO2013/007138
PCT Pub. Date: Jan. 17, 2013

(65) Prior Publication Data
US 2014/0217660 A1  Aug. 7, 2014

Related U.S. Application Data

(60) Provisional application No. 61/506,716, filed on Jul. 12, 2011.

(51) Int. Cl.
*F16F 13/30* (2006.01)
(52) U.S. Cl.
CPC ......... *F16F 13/305* (2013.01); *F16F 2224/045* (2013.01)
(58) Field of Classification Search
CPC ...................................... F16F 13/305

USPC ............... 188/267, 267.1, 267.2, 322; 267/140.14, 140.15
See application file for complete search history.

(56) References Cited

U.S. PATENT DOCUMENTS 5,000,299 A * 3/1991 Goto et al. ................ 188/267.1
5,284,330 A * 2/1994 Carlson et al. ........... 267/140.14
(Continued)

FOREIGN PATENT DOCUMENTS

| CN | 100356082 | 12/2007 |
|---|---|---|
| CN | 201144995 | 11/2008 |

(Continued)

OTHER PUBLICATIONS

International Search Report, Oct. 18, 2012, three pages.

*Primary Examiner* — Robert A Siconolfi
*Assistant Examiner* — Mahbubur Rashid
(74) *Attorney, Agent, or Firm* — Dickinson Wright PLLC

(57) ABSTRACT

A tie bar assembly includes front and rear units each including inner inserts interconnected with outer inserts with webs of elastomeric material. A pole sub-assembly is disposed between the units. The pole sub-assembly and the units define front and rear fluid chambers containing a magneto-rheological fluid. Fluid orifices are disposed through the pole sub-assembly for flow of the magneto-rheological fluid between fluid chambers. An electromagnet coil generates an electromagnetic field to affect viscosity of the magneto-rheological fluid. A connecting rod connects inner inserts and is slidably disposed through the pole sub-assembly for causing movement of the magneto-rheological fluid between fluid chambers. A displacement sensor detects movement to generate a signal to the electromagnet coil. Front and rear travel cushions are each disposed on the inner inserts for limiting the movement of the inner inserts toward the pole sub-assembly.

2 Claims, 2 Drawing Sheets

(56) References Cited

U.S. PATENT DOCUMENTS

| | | | |
|---|---|---|---|
| 5,458,217 A * | 10/1995 | Ohishi | 188/267.1 |
| 5,492,312 A * | 2/1996 | Carlson | 267/140.14 |
| 5,718,418 A * | 2/1998 | Gugsch | 267/140.14 |
| 5,957,440 A * | 9/1999 | Jones et al. | 267/140.14 |
| 6,896,109 B2 * | 5/2005 | Kelso et al. | 188/267.1 |
| 7,070,027 B2 * | 7/2006 | Manecke et al. | 188/267.2 |
| 7,849,983 B2 * | 12/2010 | St. Clair et al. | 188/267.1 |
| 8,322,497 B2 * | 12/2012 | Marjoram et al. | 188/267 |

| | | |
|---|---|---|
| 2006/0254871 A1 | 11/2006 | Murty et al. |

FOREIGN PATENT DOCUMENTS

| | | |
|---|---|---|
| CN | 101989803 | 3/2011 |
| DE | 10108533 | 9/2002 |
| EP | 1803961 A1 | 7/2007 |
| JP | 2007153173 | 6/2007 |
| WO | 2004067994 A1 | 8/2004 |

* cited by examiner

DOUBLE PUMPER MAGNETO-RHEOLOGICAL HYDRAULIC TIE BAR ASSEMBLY

CROSS REFERENCE TO RELATED APPLICATION

This application claims the benefit of PCT International Application Serial No. PCT/CN2012/076439 filed on Jun. 4, 2012, which claims the benefit of U.S. provisional application Ser. No. 61/506,716 filed Jul. 12, 2011.

BACKGROUND OF THE INVENTION

1. Field of the Invention

A tie bar assembly for use in a vehicle useful for controlling powertrain movements around and perpendicular to the powertrain roll axis and to isolate powertrain generated vibrations.

2. Description of the Prior Art

The tie bar assemblies of the type to which the subject invention pertains, attach to a vehicle chassis and to a powertrain component and dampen vibrational forces from the powertrain component. One such tie bar assembly is illustrated in U.S. Pat. No. 4,887,801 A to Wolf et al. wherein a housing having a tubular shape is disposed about a central axis. This invention includes a rear unit disposed annularly about the central axis in the housing and includes a cylindrical rear inner insert and a rear outer insert. A rear web interconnects the rear inserts for allowing axial movement of the rear inner insert relative to the rear outer insert. Additionally, a front unit is disposed annularly about the central axis in the housing and includes a cylindrical front inner insert and a front outer insert. A front web interconnects the front inserts for allowing axial movement of the front inner insert relative to the front outer insert. A connecting rod is disposed along the central axis and is attached to the rear inner insert and the front inner insert. This patent and U.S. Patent Application No. 2009/0090586 A1 by Lopez, Jr. et al. disclose a pole sub-assembly that is disposed annularly about the central axis. In Wolf et al. the pole sub-assembly is disposed between the rear unit and the front unit. The pole sub-assembly and the units define a front fluid chamber extending annularly about the central axis and a rear fluid chamber extending annularly about the central axis. Lopez, Jr. et al. discloses a magneto-rheological fluid contained within a front fluid chamber and a rear fluid chamber. Additionally, a plurality of fluid orifices are disposed through the pole sub-assembly for fluid flow of the magneto-rheological fluid between the front fluid chamber and the rear fluid chamber. The Lopez, Jr. et al. pole sub-assembly also includes an outer pole member extending annularly about the central axis and an inner pole member extending annularly about the central axis and radially aligned with the outer pole member. Lopez, Jr. et al. also shows a pole sub-assembly that includes a rear end plate disposed on one side of the inner pole member and includes a front end plate disposed on the opposite side of the inner pole member. U.S. Patent Application 2012/0091639 A1 by Lee et al. discloses another similar assembly for use in a vehicle that includes separate fluid chambers containing a fluid wherein a plurality of fluid orifices allow fluid flow between the fluid chambers.

However, the prior art tie bars include an elastomer diaphragm causing complete hydraulic separation between the front and rear fluid chambers. Additionally, some of the prior art tie bars do not include a cushion to limit movement of the inner inserts against the pole sub-assembly, or only include a cushion on either the front insert or rear insert.

SUMMARY OF THE INVENTION

The invention provides for such a tie bar assembly wherein the connecting rod is slidably disposed in the central bore of the pole sub-assembly for causing movement of the magneto-rheological fluid between the front fluid chamber and the rear fluid chamber through the fluid orifices in response to movement of the shaft in either direction along the central axis.

The subject invention relates to a controllable hydraulic assembly which includes two elastomeric fluid chambers filled with magneto-rheological fluid and connected by a plurality of fluid orifices, and an electromagnet coil to generate a magnetic field across the fluid orifices. The invention provides a tie bar assembly that is efficiently fabricated and limits the movement of the inner insert toward the pole sub-assembly. Furthermore, it provides the ability to change the stiffness and damping level using the two fluid chambers in combination with the magneto-rheological fluid.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
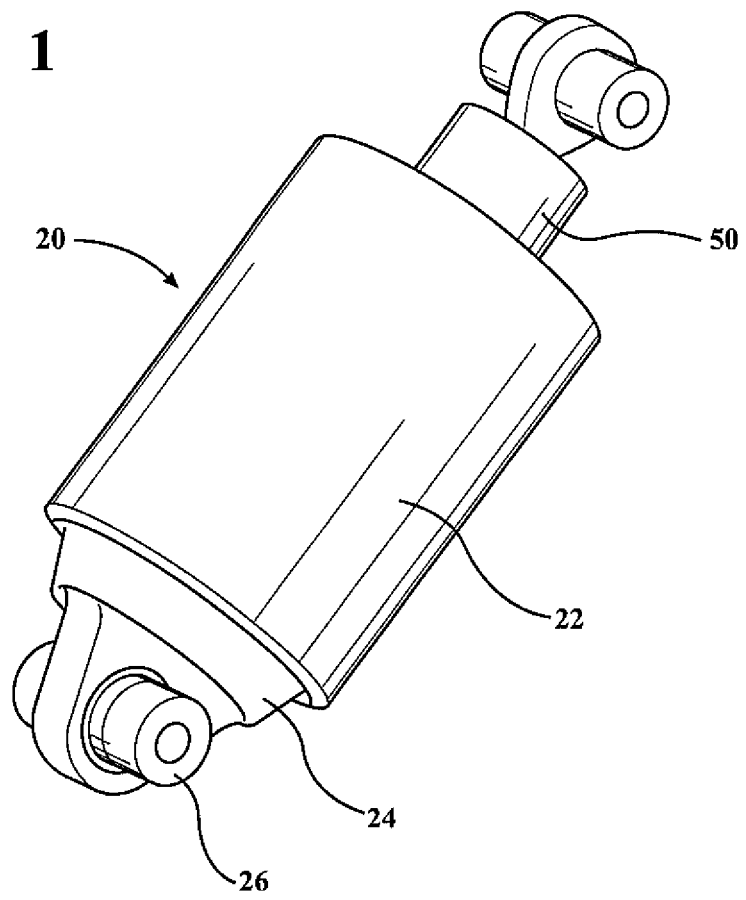
FIG. 1 is a perspective view of the tie bar assembly.
Figure 2:
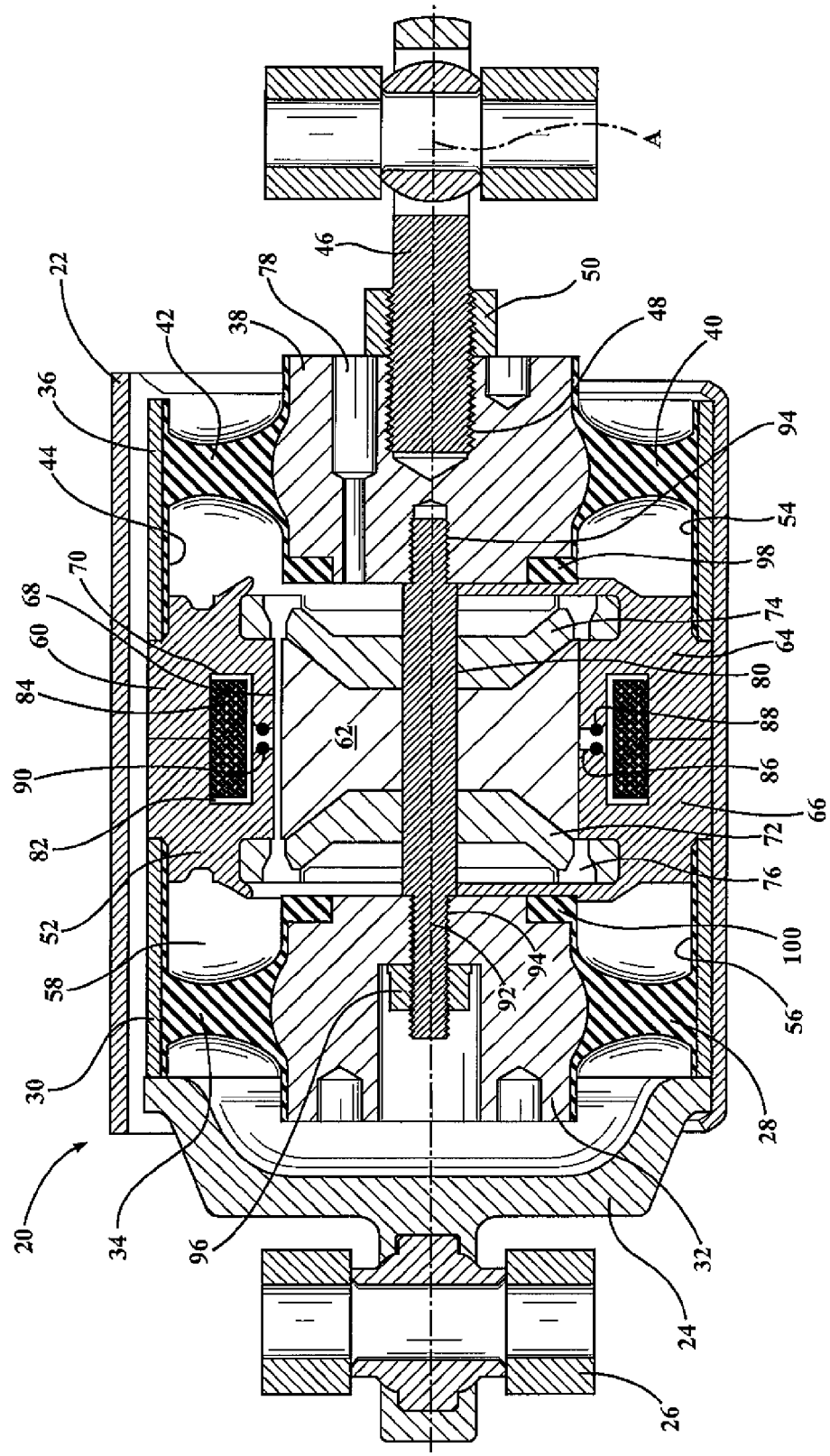
FIG. 2 is a cross-sectional view of the tie bar assembly.

Referring to the Figures, wherein like numerals indicate corresponding parts throughout the several views, a tie bar assembly 20 for use in a vehicle constructed in accordance with the subject invention is shown in FIGS. 1 and 2.

The tie bar assembly 20 includes a housing 22 having a tubular shape disposed about a central axis A. An end cap 24 is disposed at one end of the housing 22 and includes a connection 26 for attachment to a vehicle chassis. A rear unit 28 is disposed annularly about the central axis A in the housing 22 and includes a cylindrical rear outer insert 30 that engages the housing 22 and includes a cylindrical rear inner insert 32 disposed concentrically within the rear outer insert 30. A rear web 34 of elastomeric material radially interconnects the rear inserts 30, 32 for allowing axial movement of the rear inner insert 32 relative to the rear outer insert 30.

The tie bar assembly 20 also includes a front unit 40 disposed annularly about the central axis A in the housing 22 and includes a cylindrical front outer insert 36 that engages the housing 22 and includes a cylindrical front inner insert 38 disposed concentrically within the front outer insert 36. A front web 42 of elastomeric material radially interconnects the front inserts 36, 38 for allowing axial movement of the front inner insert 38 relative to the front outer insert 36. The units 28, 40 are axially spaced in the housing 22 to define a pole chamber 44. A shaft 46 including a plurality of shaft threads 48 also threadedly engages one end of the front inner insert 38 for attachment to a powertrain component. A jam nut 50 is threadedly disposed on the shaft 46 in contact with the front inner insert 38 for preventing the shaft 46 from backing out of the front inner insert 38

A pole sub-assembly 52 is disposed in the pole chamber 44 annularly about the central axis A and between the rear unit 28 and the front unit 40. The pole sub-assembly 52 and the units 28, 40 define a front fluid chamber 54 extending annularly about the central axis A and a rear fluid chamber 56 extends annularly about the central axis A. A magneto-rheological fluid 58 is contained within the front fluid chamber 54 and the rear fluid chamber 56. The pole sub-assembly 52 includes an outer pole member 60 extending annularly about the central axis A and an inner pole member 62 that extends annularly about the central axis A and is radially aligned with the outer pole member 60. The outer pole member 60 includes a front half 64 and a rear half 66 each having a central aperture 68 and defining an annular cavity 70 extending concentrically about the central axis A. The pole sub-assembly 52 includes a rear end plate 72 disposed on one side of the inner pole member 62 and includes a front end plate 74 disposed on the opposite side of the inner pole member 62. A plurality of fluid orifices 76 are disposed through the pole sub-assembly 52 between the inner pole member 62 and the outer pole member 60 for fluid flow of the magneto-rheological fluid 58 between the front fluid chamber 54 and the rear fluid chamber 56. Additionally, a supply passage 78 is disposed in the front inner insert 38 for adding the magneto-rheological fluid 58 to the pole chamber 44. The pole sub-assembly 52 defines a central bore 80 disposed along the central axis A that extends between the front end plate 74 and rear end plate 72 and through the inner pole member 62.

A bobbin 82 is disposed between the rear outer pole and the front outer pole within the annular cavity 70. An electromagnet coil 84 is disposed on the bobbin 82 in the annular cavity 70 for generating an electromagnetic field to affect viscosity of the magneto-rheological fluid 58. The front and rear halves of the outer pole member 60 define a gap 86 extending radially into the annular cavity 70 and the bobbin 82 extends into the gap 86 and defines seal seats 88 extending annularly. A plurality of o-rings 90 are disposed in the seal seats 88 of the bobbin 82 for preventing the magneto-rheological fluid 58 from leaking into the annular cavity 70.

A connecting rod 92 is disposed along the central axis A and has connecting rod threads 94 on both ends. It is attached to the rear inner insert 32 and the front inner insert 38. A sealing nut 96 is threadedly attached to the connecting rod 92 for securing front inner insert 38 and preventing the magneto-rheological fluid 58 from leaking from the rear fluid chamber 56. A displacement sensor is disposed on the powertrain component for detecting the axial movement of the front inner insert 38 and sending a signal to an electronic controller that generates a signal to the electromagnet coil 84. Alternatively, a pressure sensor may be used for this same purpose. The connecting rod 92 is slidably disposed in the central bore 80 of the pole sub-assembly 52 for causing movement of the magneto-rheological fluid 58 between the front fluid chamber 54 and the rear fluid chamber 56 through the fluid orifices 76 in response to simultaneous movement of the shaft 46 in either direction along the central axis A.

Because the movement of the front inner insert 38 may be drastic under some circumstances, a front travel cushion 98 is disposed on one side of the front inner insert 38 for limiting the movement of the front inner insert 38 toward the pole sub-assembly 52. For the same reason, a rear travel cushion 100 is disposed on one side of the rear inner insert 32 for limiting the movement of the rear inner insert 32 toward the pole sub-assembly 52 as well.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A tie bar assembly for use in a vehicle comprising;
a housing having a tubular shape disposed about a central axis,
a rear unit disposed annularly about said central axis in said housing including a cylindrical rear inner insert and a rear outer insert and a rear web interconnecting said rear inserts for allowing axial movement of said rear inner insert relative to said rear outer insert,
a front unit disposed annularly about said central axis in said housing including a cylindrical front inner insert and a front outer insert and a front web interconnecting said front inserts for allowing axial movement of said front inner insert relative to said front outer insert,
a connecting rod disposed along said central axis attached to said rear inner insert and said front inner insert, a pole sub-assembly disposed annularly about said central axis and between said rear unit and said front unit, said pole sub-assembly and said units defining a front fluid chamber extending annularly about said central axis and a rear fluid chamber extending annularly about said central axis,
a magneto-rheological fluid contained within said front fluid chamber and said rear fluid chamber, a plurality of fluid orifices disposed through said pole sub-assembly for fluid flow of said magneto-rheological fluid between said front fluid chamber and said rear fluid chamber,
said pole sub-assembly having a central bore and said connecting rod slidably disposed in said central bore for causing movement of said magneto-rheological fluid between said front fluid chamber and said rear fluid chamber through said fluid orifices in response to simultaneous movement of said inner inserts in either direction along said central axis, and
a front travel cushion disposed on one side of said front inner insert for limiting the said movement of said front inner insert toward said pole sub-assembly and a rear travel cushion disposed on one side of said rear inner insert for limiting said movement of said rear inner insert toward said pole sub-assembly.

2. A tie bar assembly for use in a vehicle comprising;
a housing having a tubular shape disposed about a central axis,
an end cap disposed at one end of said housing including a connection for attachment to a vehicle chassis,
a rear unit disposed annularly about said central axis in said housing including a cylindrical rear outer insert engaging said housing and including a cylindrical rear inner insert disposed concentrically within said rear outer insert and a rear web of elastomeric material radially interconnecting said rear inserts for allowing axial movement of said rear inner insert relative to said rear outer insert,
a front unit disposed annularly about said central axis in said housing including a cylindrical front outer insert engaging said housing and including a cylindrical front inner insert disposed concentrically within said front outer insert and a front web of elastomeric material radially interconnecting said front inserts for allowing axial movement of said front inner insert relative to said front outer insert,
said units being axially spaced in said housing to define a pole chamber, a pole sub-assembly disposed in said pole chamber annularly about said central axis and between said rear unit and said front unit, said pole sub-assembly and said units defining a front fluid chamber extending annularly about said central axis and a rear fluid chamber extending annularly about said central axis, aid pole sub-assembly including an outer pole member extending annularly about said central axis and an inner pole member extending annularly about said central axis and radially aligned with said outer pole member, said outer pole member including a front half and a rear half each having a central aperture and defining an annular cavity extending concentrically about said central axis, said pole sub-assembly including a rear end plate disposed on one side of said inner pole member and including a front end plate disposed on the opposite side of said inner pole member, a shaft including a plurality of shaft threads threadedly engaging one end of said front inner insert for attachment to a powertrain component, a jam nut threadedly disposed on said shaft in contact with said front inner insert for preventing said shaft from backing out of said front inner insert, a magneto-rheological fluid contained within said front fluid chamber and said rear fluid chamber, a bobbin disposed between said rear outer pole and said front outer pole within said annular cavity, an electromagnet coil disposed on said bobbin in said annular cavity for generating an electromagnetic field to affect viscosity of said magneto-rheological fluid, said front and rear halves of said outer pole member defining a gap extending radially into said annular cavity, said bobbin extending into said gap and defining seal seats extending annularly, a plurality of o-rings disposed in said seal seats of said bobbin for preventing said magneto-rheological fluid from leaking into said annular cavity, a plurality of fluid orifices disposed through said pole assembly between said inner pole member and said outer pole for fluid flow of said magneto-rheological fluid between said front fluid chamber and said rear fluid chamber, a supply passage disposed in said front inner insert for adding said magneto-rheological fluid to said pole chamber, a connecting rod disposed along said central axis and having connecting rod threads on both ends attached to said rear inner insert and said front inner insert, a sealing nut and threadedly attached to said connecting rod for securing front inner insert and preventing said magneto-rheological fluid from leaking from said rear fluid chamber, a displacement sensor disposed on powertrain component for detecting said axial movement of said front inner insert for generating a signal to said electromagnet coil, said pole sub-assembly defining a central bore disposed along said central axis extending between said front end plate and rear end plate and through said inner pole member, said connecting rod slidably disposed in said central bore of said pole sub-assembly for causing movement of said magneto-rheological fluid between said front fluid chamber and said rear fluid chamber through said fluid orifices in response to movement of said shaft in either direction along said central axis, a front travel cushion disposed on one side of said front inner insert for limiting the said movement of said front inner insert toward said pole sub-assembly, a rear travel cushion disposed on one side of said rear inner insert for limiting said movement of said rear inner insert toward said pole sub-assembly.

* * * * *